No. 686,607. Patented Nov. 12, 1901.
R. HAMILTON.
HAY OR COTTON PRESS.
(Application filed Apr. 23, 1901.)

(No Model.) 4 Sheets—Sheet 1.

WITNESSES:
W. R. Edelin.
Amos Hart.

INVENTOR
Robert Hamilton
BY Munn & Co.
ATTORNEYS

No. 686,607. Patented Nov. 12, 1901.
R. HAMILTON.
HAY OR COTTON PRESS.
(Application filed Apr. 23, 1901.)
(No Model.) 4 Sheets—Sheet 2.

WITNESSES: INVENTOR
Robert Hamilton
BY Munn & Co.
ATTORNEYS

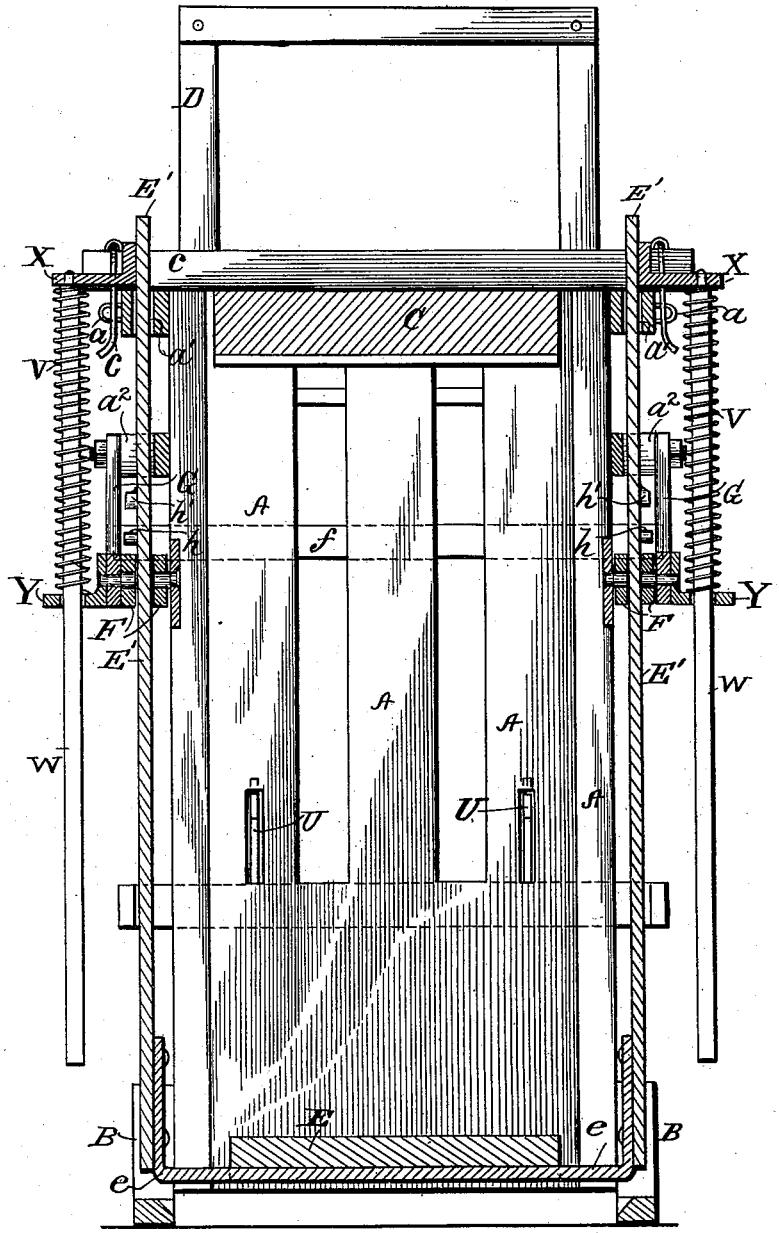

No. 686,607. Patented Nov. 12, 1901.
R. HAMILTON.
HAY OR COTTON PRESS.
(Application filed Apr. 23, 1901.)
(No Model.) 4 Sheets—Sheet 4.
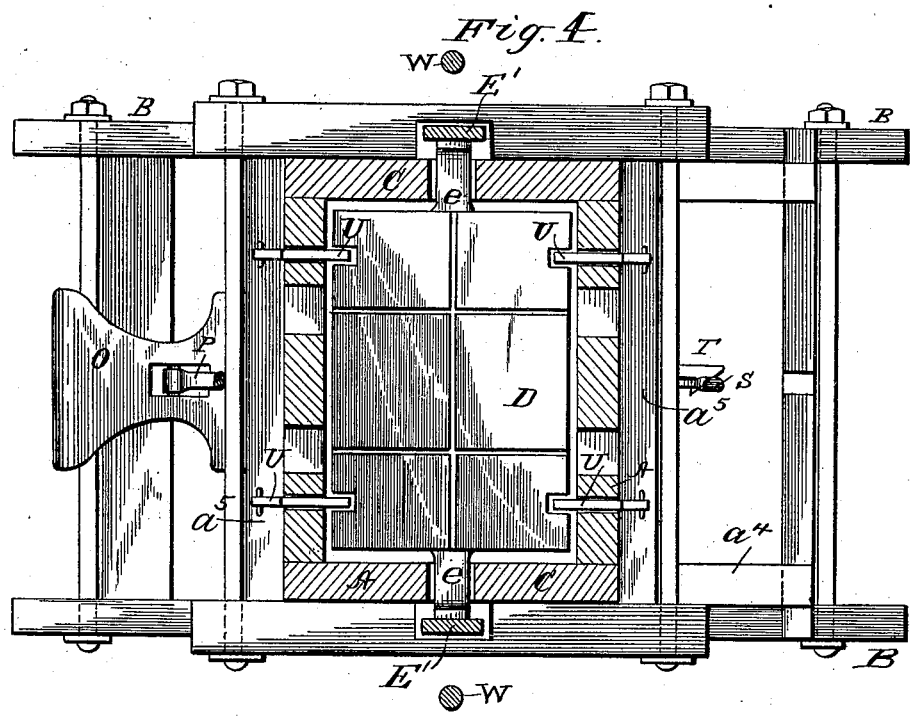
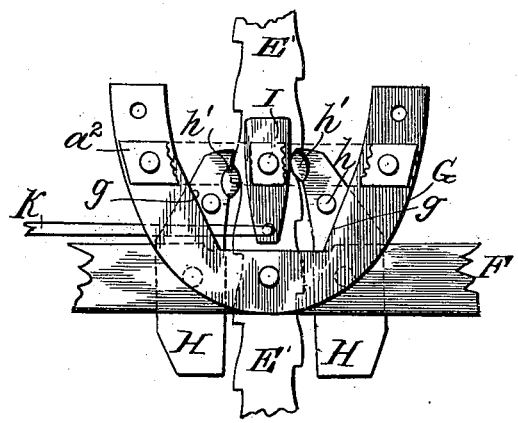
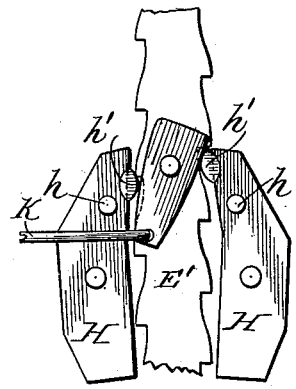
WITNESSES: INVENTOR
Robert Hamilton
BY Munn & Co.
ATTORNEYS
THE NORRIS PETERS CO., PHOTO-LITHO., WASHINGTON, D. C.

UNITED STATES PATENT OFFICE.

ROBERT HAMILTON, OF COMMERCE, TEXAS.

HAY OR COTTON PRESS.

SPECIFICATION forming part of Letters Patent No. 686,607, dated November 12, 1901.

Application filed April 23, 1901. Serial No. 57,116. (No model.)

*To all whom it may concern:*

Be it known that I, ROBERT HAMILTON, a citizen of the United States, residing at Commerce, Hunt county, Texas, have made certain new and useful Improvements in Hay or Cotton Presses, of which the following is a specification.

My invention is an improvement in the class of hand-operated vertical presses for pressing and baling hay and seed-cotton.

The follower is provided with ratchet-bars, and the hand-levers are operatively connected therewith by means of pawls or dogs which are arranged to be tripped by a peculiar mechanism. I also employ a friction-brake for regulating the descent of the follower when the dogs are released. I likewise provide automatic devices for sustaining the charge of compressed hay or cotton while the follower is descending and another charge is being inserted in the press-box. I further provide the lower portion of the press-box with a hinged door for receiving a charge of hay or cotton. I provide the top portion of the press-box with a hinged and foldable support for the removable top when not required for use.

The details of construction, arrangement, and operation are as hereinafter described, reference being had to the accompanying drawings, in which—

Figure 1:
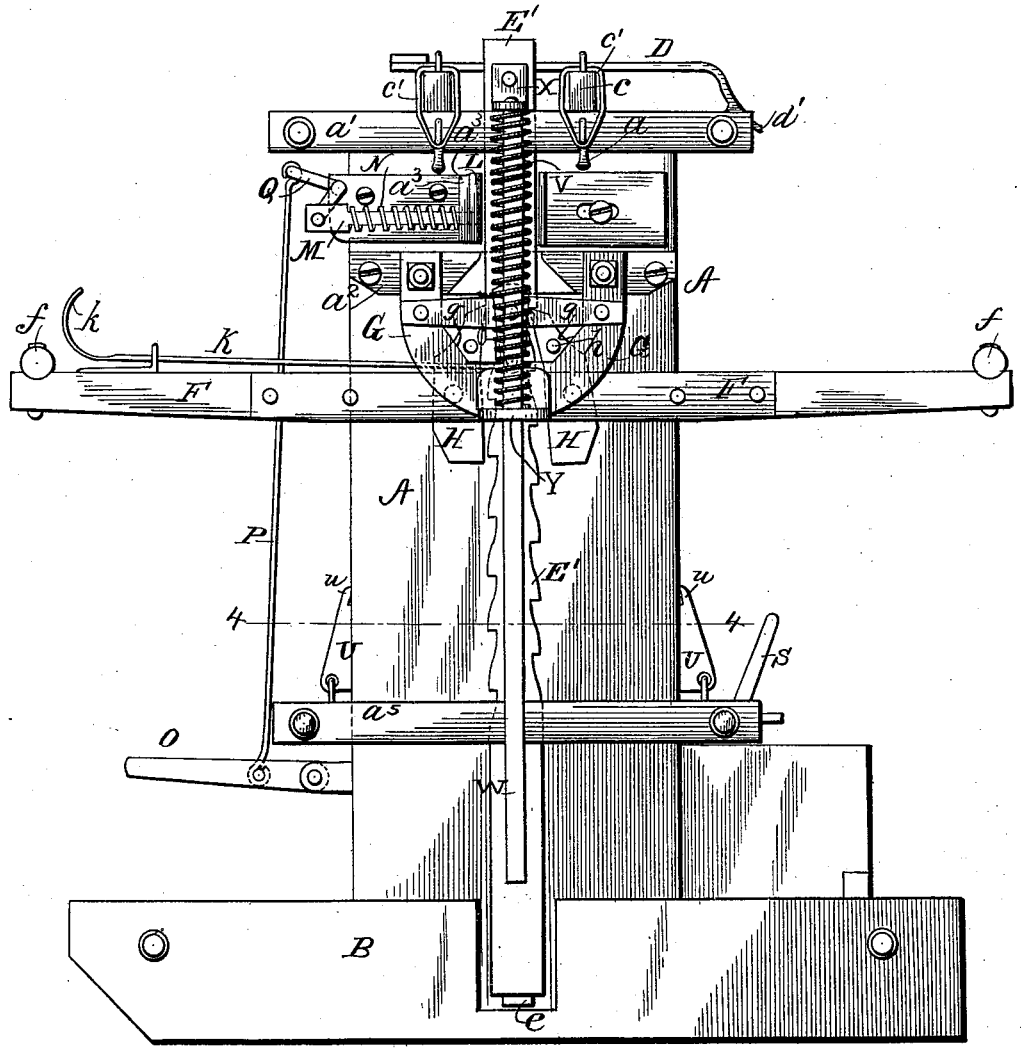
Figure 2:
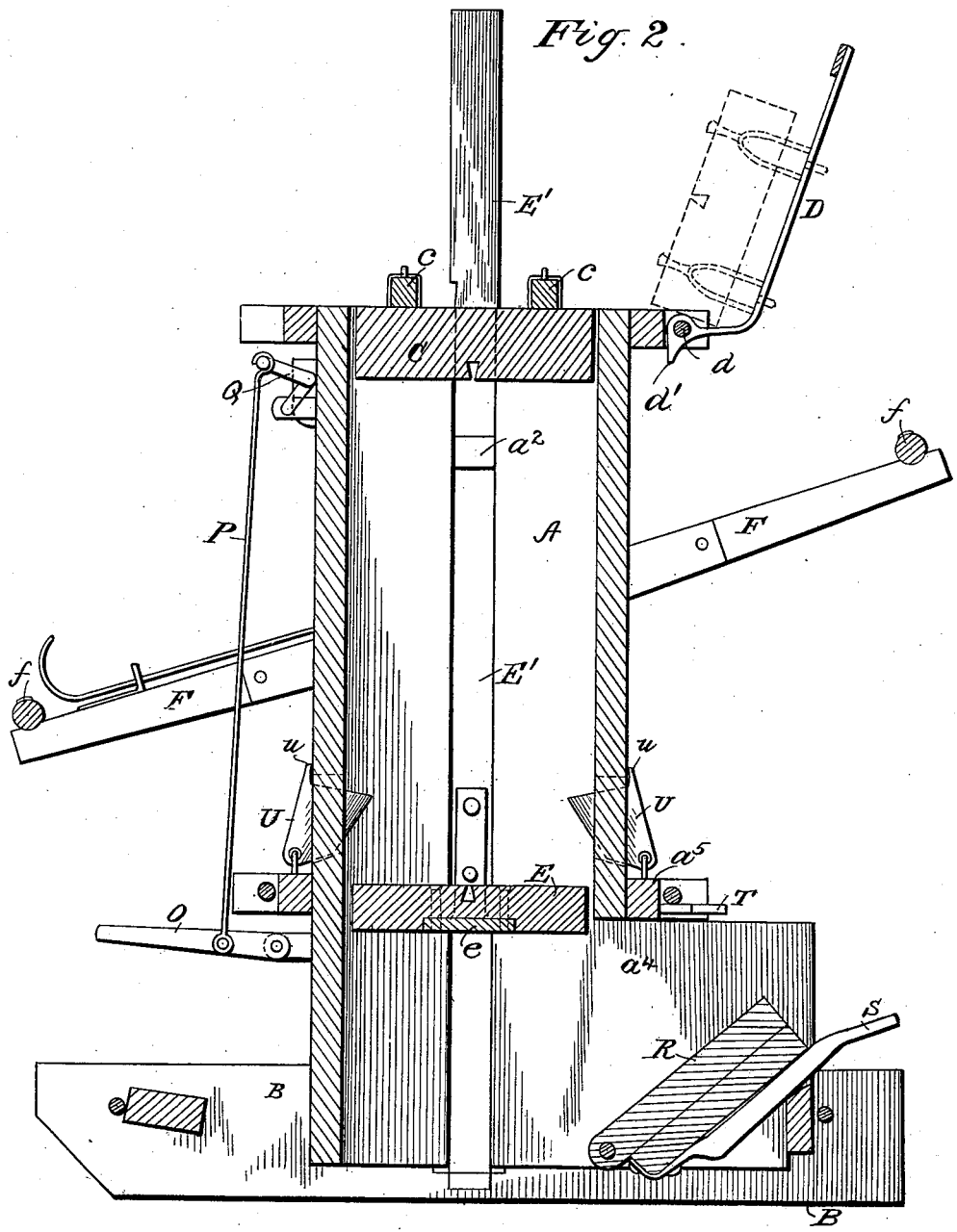

Figure 1 is a side elevation of my improved press. Fig. 2 is a central vertical section thereof, taken in a plane parallel to the levers which operate the follower. Fig. 3 is a central vertical section of the press-box in a plane at right angles to that shown in Fig. 2. Fig. 4 is a horizontal section on the line 4 4 of Fig. 1. Fig. 5 is a detail view showing the arrangement of the dogs or pawls with relation to the levers and ratchet-bars of the follower. Fig. 6 is another detail view of the same parts, showing the dogs or pawls tripped to allow the descent of the follower. Fig. 7 is a detail plan view showing the construction of the upper ends of the dogs or pawls.

The vertical press-box A is fixed upon a horizontal base B and provided with vertical slots on opposite sides, as is usual in this class of presses. The top C of the press-box is removable and when not in use is supported, as shown in dotted lines, Fig. 2, upon a pivoted and folding rack on frame D. The latter is pivoted upon a rod $d$, passing horizontally through ears projecting from the side of the press-box A, and is provided with toes $d'$, which when the frame D is thrown back or inclined abut a beam or portion of the press-box, and thereby support the frame in the required position. When not in use, the said frame D is folded in horizontal position, as shown in Fig. 1. The top or press-block C is secured to the press-box for use by means of bales $c'$, pivoted to cross-bars $c$ and engaging the staples $a$ on the press-box A, as shown in Figs. 1 and 3. The lower ends of the bales $c$ project below the staples $a$ and are suitably constructed to serve as handles for engaging them with or disengaging them from the staples, as will be readily understood.

The vertically-movable follower E is provided with a transverse bottom bar $e$, which extends through the slots in the side of the press-box and is rigidly connected with ratchet-bars E', which work vertically in guide-slots formed in the top portion or framing $a'$ of the press-box A. (See Fig. 3.) As shown in Fig. 1, the lateral teeth or shoulders of these ratchet-bars are staggered or arranged alternately, so that they are diagonally instead of diametrically opposite. The levers F for operating the follower E are pivoted at the middle of their length on the opposite sides of the press-box A and extend equidistantly therefrom, their outer ends being connected by means of transverse hand-bars $f$. The levers are pivoted between the sides of the press-box A and a semicircular or U-shaped hanger G, which is bolted to a laterally-projecting beam or fixed portion $a^2$ of the press-box and is spaced from the latter a distance sufficient to receive the levers. The means for operative connection between these levers F and the rack-bars E' of the follower are pawls or dogs H, of which there are two pairs, the members of each pair being arranged on opposite sides of the ratchet-bars E', as shown in Figs. 1 and 5. It will be seen that by arrangement of the dogs H their upper ends engage the rack-bars and disengage therefrom alternately as the levers F are vibrated in a vertical plane—that is to say, whichever pawl or dog rises is designed to engage a ratchet-bar, while the opposite dog slides over the teeth of the same. To insure such engagement, I provide each dog with a lateral pin $h$, which as the dog descends slides in frictional contact with a cam or fixed surface $g$, formed on the inner side of the hanger G, (see Fig. 5,) whereby the head or nose of the dog is thrown inward toward the ratchet-bar, as will be readily understood. As a further means for insuring due engagement or lock of the dogs with the ratchet-bars E', I extend the lower portions of the dogs below their pivots and provide them with straight inner edges, which when the levers F are inclined at their greatest angle come in contact with the ratchet-teeth, so that the noses of the dogs, which are slightly inclined inward, press in that direction. By vibrating the levers F the follower is raised step by step. For the purpose of throwing the dogs H simultaneously out of engagement or lock with the ratchet-bars E', as required when the follower E is allowed to descend rapidly, I employ a trip device I, (see Figs. 5 and 6,) which consists of an elongated block pivoted equidistantly between the upper ends of the adjacent dogs. The latter are provided with contact-surfaces $h'$, (see Fig. 7,) one of which is located at a point which is higher than the other, so that when the trip I is thrown into diagonal position, as shown in Fig. 6, it will be pressed against these surfaces, and thus separate the dogs from the ratchets. For operating—that is, tilting—these trip devices I, I employ rods K, (see Figs. 1 and 2,) which are arranged to slide in keepers attached to the levers F and are provided with curved handholds $k$ at their outer ends.

To regulate the descent of the follower when the levers F are horizontal, as shown in Fig. 1, and the trip devices I have been drawn into position, as shown in Fig. 6, I employ a brake constructed as follows: A brake-block L (see Fig. 1) is arranged on each side of the press-box near the top thereof, adjacent to the ratchet-bar E'. Said block L is fixed on the inner end of a slidable rod M, which works in a guide $a^3$ and is encircled by a spring N, which acts against the guide $a^3$ and tends to hold the friction-block L normally out of contact with the ratchet-bar. For the purpose of forcing these brake-blocks L into contact with the ratchets E', I employ a pedal O, which is pivoted to the side of the press-box and connected by a rod P with a three-armed crank-shaft Q. The latter is journaled on the side of the press-box adjacent to the slidable rod M, with which two of its cranks are connected, as shown. It is obvious that by depressing the pedal O the crank-shaft Q will force the rods N inward, and thereby apply the brake.

In Fig. 2 I show an opening $a^4$ in the side of the press-box and a door R, which is hinged and adapted to close the same. When the door R is thrown back in the inclined position shown, space is provided for the insertion of a charge of hay or cotton above the follower E, which in that case is to be adjusted to its lowest position. After such insertion the door is closed and locked by engagement of a spring-lever S with a bevel-catch T. The said lever is attached to the door, and its free upper end is so arranged as to ride over the beveled head of the catch T when the door closes and then to spring laterally behind the shoulder of the same. When a charge of hay or cotton or other substance being pressed has been elevated by the follower a short distance above the lateral opening $a^4$, the follower is again lowered for another charge, and the previous one is held thus elevated by means of pivoted dogs U. (See Figs. 1 and 4.) These dogs are in the nature of broad plates which are pivoted at their lower ends on a framing $a^5$, exterior to the press-box, and are adapted to project and work through slots in the latter, so as to extend a short distance into the press-chamber. They are provided with ears $u$, which prevent them from passing through the slots, and when the dogs U are pressed outward they are prevented from falling in that direction by engagement of their inner angles with the top portions of the slots. It will be understood that when a charge of hay or cotton is being elevated by the follower E the dogs U are pressed back, as shown by dotted lines, Fig. 2, and that when said charge has passed above them they fall by gravity back to their normal position, (shown by full lines in said figure,) and thus prevent downward movement of the charge.

For the purpose of counterbalancing the weight of the follower E, I employ springs V, (see Fig. 3,) which are coiled about rods W, that are permanently connected with the upper ends of the ratchet-bars E', by means of ears or lugs X and work through perforated ears Y, attached to the hangers G. The springs V rest upon the ears X and are compressed when the follower descends.

What I claim is—

1. In a press of the character described, the combination with a press-box and follower adapted to move vertically therein, ratchet-bars attached to the follower and projecting vertically on the sides of the press-box, of levers pivoted to the press-box and adapted to vibrate in a vertical plane, dogs pivoted to and moving with the levers, and cam projections or surfaces arranged contiguous to the dogs and adapted to engage the same for throwing them alternately into engagement with the ratchet-bars as the levers are vibrated, substantially as shown and described.

2. In a press of the character described, the combination with a vertical press-box, a follower adapted to move vertically therein, bars having ratchet-teeth on opposite sides which are staggered or alternated as described, hand-levers pivoted on opposite sides of the press-box, dogs pivoted to the said levers and adapted to engage with the opposite ratchet-teeth of said bars, alternately, and means for throwing the dogs alternately inward, to effect such engagement, substantially as shown and described.

3. In a press of the character described, the combination with a press-box, a follower, and ratchet-bars attached to the latter, of levers pivoted to the sides of the press-box, dogs pivoted to the levers and having lateral projections, and fixed inclines or cams which engage said projections as the levers are vibrated and the dogs descend, substantially as described.

4. In a press of the character described, the combination, with a vertical press-box and follower having ratchet-bars provided with teeth which are alternated or staggered on opposite sides, of levers pivoted on the sides of the press-box and extending in opposite directions therefrom, dogs pivoted to said levers on opposite sides of each ratchet-bar and having lateral ears or projections, and fixed hangers on the side of the press-box having inclines with which the projections of the dogs work in contact as the levers are vibrated, and whereby the noses of the dogs are forced inward as the latter descend with each vibration of the levers, substantially as shown and described.

5. In a press of the character described, the combination with a press-box and a follower therein having ratchet-bars on its opposite ends, levers pivoted to the sides of the press-box parallel thereto, dogs connected with the levers and adapted to engage the ratchet-bars, and pull-rods arranged on the levers, and a device I to which said rods are attached for tripping the dogs, substantially as shown and described.

6. In a press of the character described, the combination with a press-box and follower slidable therein, ratchet-bars and levers pivoted on the sides of the press-box, two dogs pivoted to each lever on opposite sides of a ratchet-bar, a trip device pivoted and arranged between each two dogs and adapted to engage with both simultaneously, and means for operating said device, whereby the dogs may be thrown simultaneously out of engagement with the ratchet-bars, substantially as shown and described.

7. In a press of the character described, the combination with a vertical press-box, a follower slidable therein and having ratchet-bars arranged to work in vertical guides, of levers pivoted on opposite sides of the press-box, two dogs pivoted to each lever on opposite sides of a ratchet-bar and having lateral ears or projections, a trip device pivoted and arranged between such projections of the dog, and rods extending outward on the levers, for use in moving said device to trip the dogs, substantially as shown and described.

8. The improved press comprising the press-box, the follower slidable therein, ratchet-bars attached to the follower and extending upward, levers pivoted on the sides of the press-box, and dogs pivoted to said levers for engaging the said ratchet-bars, devices for holding the dogs out of action simultaneously, and a friction-brake arranged in proximity to the ratchet-bars and adapted to act thereon, and means for operating the said brake, whereby the ratchet-bars and follower may be held suspended or locked while the dogs are released, as shown and described.

9. The improved press comprising the press-box, the follower slidable therein, ratchet-bars attached to the follower and extending upward on the sides of the press-box, levers pivoted on the sides of the box, and dogs pivoted to said levers and adapted to engage the ratchet-bars, a device interposed between the dogs, and a rod extending outward on the levers, for tripping the said device and thereby holding the dogs out of action simultaneously, and the friction-brake arranged on the press-box in proximity to the ratchet-bars, a crank-shaft for operating the same, a rod connected therewith, and a treadle arranged below the aforesaid levers, as shown and described, whereby the levers may be held in horizontal position, the dogs released, and the brake applied in the manner described, for the purpose specified.

10. In a press of the character described, the combination, with a vertical press-box, a follower slidable therein and having ratchet-bars extending vertically, and means for acting on said bars for elevating the follower, of rods connected with said ratchet-bars and arranged parallel thereto and working in fixed guides as described, and springs coiled on said rods for counterbalancing the weight of the follower, substantially as shown and described.

11. In a press of the character described, the combination with a press-box having a removable head or press-block, of a rack or frame hinged to the side of the press-box and provided with toes or projections adapted to engage the side of the latter when the rack is thrown into inclined position, for supporting the press-block in the manner described.

12. In a press of the character described, the combination with a vertical press-box, of a support for the removable head of the latter, the same being hinged to the head of the press-box and adapted to fold flat upon the same and have self-support when thrown backward into inclined position, substantially as shown and described.

ROBERT HAMILTON.

Witnesses:
BEN D. BEERS,
D. D. DOUGLASS.